United States Patent
Sharma et al.

(10) Patent No.: US 12,436,716 B2
(45) Date of Patent: Oct. 7, 2025

(54) METHOD AND SYSTEM FOR PERFORMING READ AND WRITE OPERATIONS IN CELLS OF A NAND MEMORY

(71) Applicant: Samsung Electronics Co., Ltd., Suwon-si (KR)

(72) Inventors: Anantha Sharma, Bengaluru (IN); Pandi Kanniah, Bengaluru (IN); Sharath Kumar Kodase, Bengaluru (IN); Suman Prakash Balakrishnan, Bengaluru (IN); Sandeep Kumar Ananthapalli, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 69 days.

(21) Appl. No.: 18/349,356

(22) Filed: Jul. 10, 2023

(65) Prior Publication Data
US 2024/0377987 A1    Nov. 14, 2024

(30) Foreign Application Priority Data
May 12, 2023    (IN) .............................. 202341033728

(51) Int. Cl.
 *G06F 3/06* (2006.01)
(52) U.S. Cl.
 CPC .......... *G06F 3/0659* (2013.01); *G06F 3/0604* (2013.01); *G06F 3/064* (2013.01); *G06F 3/0679* (2013.01)
(58) Field of Classification Search
 CPC ...... G06F 3/0659; G06F 3/0604; G06F 3/064; G06F 3/0679
 See application file for complete search history.

(56) References Cited

U.S. PATENT DOCUMENTS

| 7,336,536 B2 * | 2/2008 | Louie ..................... G11C 29/26 365/201 |
| 7,336,537 B2 * | 2/2008 | Louie ................... G11C 29/789 365/201 |

(Continued)

FOREIGN PATENT DOCUMENTS

CN    113393884 A    9/2021

OTHER PUBLICATIONS

Extended European Search Report issued Feb. 12, 2024 in European Application No. 23192895.3.
A. Hsu "New Flash Architecture Combines QLC Density with SLC Speed: X-NAND" *NEO Semiconductor*, FMS 2020 Keynote 11, pp. 1-62.

(Continued)

*Primary Examiner* — Sean D Rossiter
(74) *Attorney, Agent, or Firm* — Harness, Dickey & Pierce, P.L.C.

(57) ABSTRACT

Example embodiments of the present disclosure disclose method and system for performing read/write operations in NAND memory. A memory controller of the NAND memory receives write request from host controller to write data present in set of support cell blocks of NAND memory into a 'n'-level cell block of NAND memory. The write request includes information about mapping between set of support cell blocks and 'n'-level cell block. The mapping between set of support cell blocks and 'n'-level cell block is used to update L2P table (206). Further, memory controller performs copyback operation on set of support cell blocks for writing data to 'n'-level cell block based on L2P table using NAND latches. On receiving read request, host controller retrieves data from at least one support cell block associated with 'n'-level cell block based on mapping on determining 'n'-level cell block is listed in active block list.

15 Claims, 6 Drawing Sheets

(56) References Cited

U.S. PATENT DOCUMENTS

| | | | |
|---|---|---|---|
| 2005/0286337 A1* | 12/2005 | Louie | G11C 29/832 |
| | | | 365/232 |
| 2006/0256633 A1* | 11/2006 | Louie | G11C 29/832 |
| | | | 365/201 |
| 2018/0011635 A1* | 1/2018 | Shin | G06F 3/0679 |
| 2019/0095116 A1 | 3/2019 | Igahara et al. | |
| 2019/0102102 A1 | 4/2019 | Natarajan et al. | |
| 2020/0210335 A1* | 7/2020 | Sundrani | G06F 12/0246 |
| 2021/0406170 A1* | 12/2021 | Jung | G06F 12/0862 |
| 2022/0187999 A1 | 6/2022 | Lam et al. | |
| 2023/0061180 A1 | 3/2023 | Lam et al. | |
| 2023/0229340 A1* | 7/2023 | Winterfeld | G06F 12/0246 |
| | | | 711/154 |
| 2023/0289067 A1* | 9/2023 | Kantani | G06F 3/0619 |

OTHER PUBLICATIONS

S. Gorobets et al., 'Combined QLC Programming Method' in *Justia Patents*. Mar. 13, 2020, https://patents.justia.com/patent/20210286554.

M. Hawthorne, What is SLC Caching?' in Technipages. Jun. 27, 2022, <https://www.technipages.com/what-is-slc-caching?utm_source=rss&utm_medium=rss&utm_campaign=what-is-slc-caching#:~:text=SLC%20caching%20is%20a%20clever,written%20to%20at%20that%20speed>.

'SLC Cache vs. Direct TLC Write' in ATP. Apr. 1, 2020, <https://www.atpinc.com/blog/what-is-SLC-cache-difference-between-Dynamic-Static-SLC-cache>.

* cited by examiner

METHOD AND SYSTEM FOR PERFORMING READ AND WRITE OPERATIONS IN CELLS OF A NAND MEMORY

CROSS-REFERENCE TO RELATED APPLICATION(S)

The present application claims priority under 35 U.S.C. § 119 to Indian Application No. 202341033728, filed on May 12, 2023, the entire contents of which are hereby incorporated by reference.

TECHNICAL FIELD

The present disclosure generally relates to NAND memory, and more particularly, to a method and system for performing read and write operations in cells of a NAND memory.

BACKGROUND

Solid state drives (SSDs) based on NOT-AND (NAND) memory are increasingly used in many applications, especially for portable and consumer devices. The NAND memory stores data in 'n'-level cell blocks such as a single-level cell (SLC) block, a multi-level cell (MLC) block, a triple-level cell (TLC) block, a quad-level cell (QLC) block, a penta-level cell (PLC) block, etc., in which 'n' refers to number of bits of data that can be stored in a NAND cell block. As such, a SLC block stores 1 bit per cell, MLC block stores 2 bits per cell block, a TLC block stores 3 bits per cell block, a QLC block stores 4 bits per cell block, a PLC block stores 5 bits per cell block, and the like. As such, a memory controller in the NAND memory is the key component that manages data transfers between a host controller and the NAND memory, and storage for achieving reliable flash-based storage.

Typically, the host controller includes data buffers for temporarily storing data being read from and written to the NAND memory. More specifically, these data buffers are required in the host controller because of the differing speeds and data sizes used by the host controller and the NAND memory. Moreover, in some instances, data from the host controller may need to be re-organized before being written into the NAND memory. Restated, data from the host controller may be re-organized before being written into the NAND memory due to protocols, procedures, priorities, etc. of the NAND memory. For example, writing data into QLC cells of the NAND memory involves a two-pass approach, since it requires storing more levels of voltage in the QLC cell block. In other words, the host controller is required to store/hold the data in the data buffers for some time during programming of the 'n'-level cell blocks in the two-pass approach. As such, performing multi plane QLC program operations by the host controller demand significant amount of additional resources (i.e., data buffers) to store firmware structures. In general, the number of data buffers required in the host controller for programming 'n'-level cell blocks are high. However, the host controller has limited available memory (TCM, SRAM, System's DRAM etc.), which makes difficult to adopt existing host controllers for programming 'n'-level cell blocks.

SUMMARY

In an example embodiment, a method for writing data into cells of a NOT-AND (NAND) memory is disclosed. The method includes receiving, by a memory controller of the NAND memory, a write request from a host controller to write data present in a set of support cell blocks of the NAND memory into a 'n'-level cell block of the NAND memory. The write request includes information about a mapping between the set of support cell blocks and the 'n'-level cell block. The method includes updating, by the memory controller, a Logical to Physical (L2P) table based on the mapping between the set of support cell blocks and the 'n'-level cell block. Further, the method includes performing, by the memory controller, a copyback operation on the set of support cell blocks for writing the data to the 'n'-level cell block based on the L2P table using one or more NAND latches.

In another example embodiment, a method for reading data from cells in a NOT-AND (NAND) memory. The method includes receiving, by a memory controller of a NAND memory, a read request from a host controller to read data from an 'n'-level cell block of the NAND memory. The method includes checking, by the memory controller, if the 'n'-level cell block of the NAND memory is listed in an active block list. The active block list includes information on non-idle 'n'-level cell blocks and non-idle support cell blocks. The method includes obtaining, by the memory controller, a mapping between the set of support cell blocks and the 'n'-level cell block based on determining the 'n'-level cell block of the NAND memory is listed in the active block list. Further, the method includes retrieving, by the memory controller, the data from at least one support cell block of a set of support cell blocks associated with the 'n'-level cell block based on the mapping. The data from the at least one support cell block is provided to the host controller.

In yet another example embodiment, a memory controller for writing data into cells of a NOT-AND (NAND) memory is disclosed. The memory controller includes a memory and a processor. The memory is configured to store instructions and the processor is configured to execute the instructions stored in the memory and cause the memory controller to receive a write request from a host controller to write data present in a set of support cell blocks of the NAND memory into a 'n'-level cell block of the NAND memory. The write request includes information about a mapping between the set of support cell blocks and the 'n'-level cell block. The memory controller is caused to update a Logical to Physical (L2P) table based on the mapping between the set of support cell blocks and the 'n'-level cell block. The memory controller is caused to perform a copyback operation on the set of support cell blocks for writing the data to the 'n'-level cell block based on the L2P table using one or more NAND latches.

In still another example embodiment, a memory controller for reading data into cells of a NOT-AND (NAND) memory is disclosed. The memory controller includes a memory and a processor. The memory is configured to store instructions and the processor is configured to execute the instructions stored in the memory and cause the memory controller to receive a read request from a host controller to read data from an 'n'-level cell block of the NAND memory. The memory controller is caused to check if the 'n'-level cell block of the NAND memory is listed in an active block list. The active block list includes information on non-idle 'n'-level cell blocks and non-idle support cell blocks. The memory controller is caused to obtain a mapping between the set of support cell blocks and the 'n'-level cell block based on determining the 'n'-level cell block of the NAND memory is listed in the active block list. The memory controller is caused to retrieve the data from at least one support cell block of a set of support cell blocks associated with the 'n'-level cell block based on the mapping. The data from the at least one support cell block is provided to the host controller.

The foregoing summary is illustrative only and is not intended to be in any way limiting. In addition to the illustrative aspects, example embodiments, and features described above, further aspects, example embodiments, and features will become apparent by reference to the drawings and the following detailed description.

BRIEF DESCRIPTION OF THE DRAWINGS

The accompanying drawings, which are incorporated in and constitute a part of this disclosure, illustrate example embodiments and, together with the description, serve to explain the disclosed principles. The same numbers are used throughout the figures to reference like features and components. Some example embodiments of device and/or methods in accordance with example embodiments of the present subject matter are now described, by way of example only, and with reference to the accompanying figures, in which.

Figure 1:
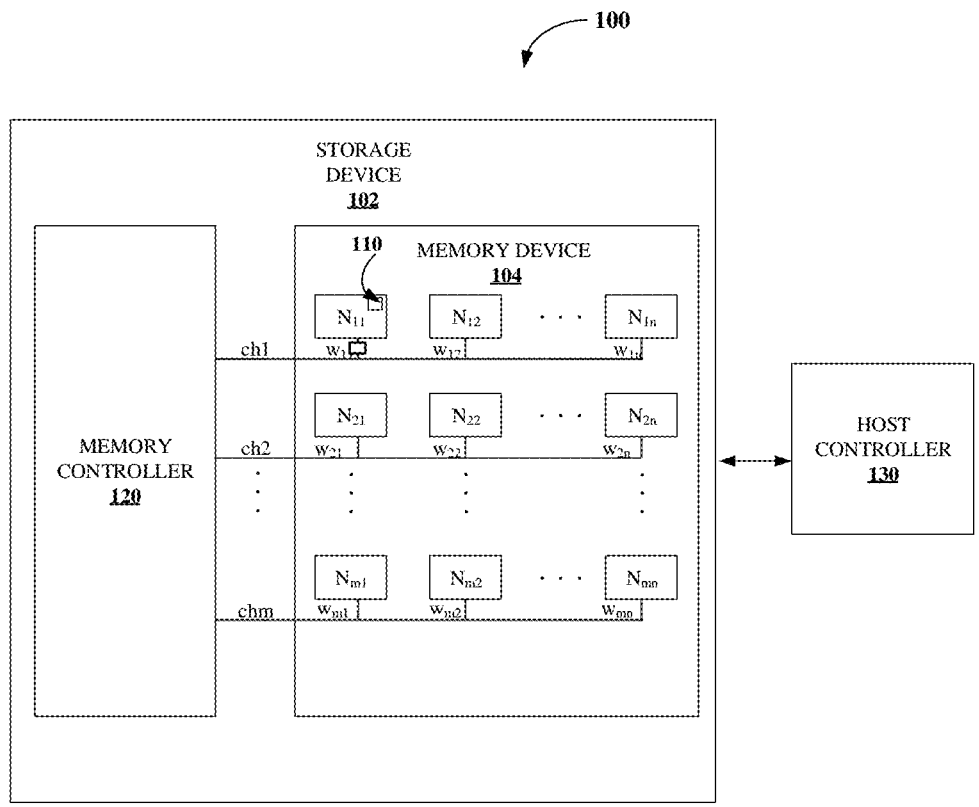
FIG. 1 is a block diagram representation 100 of a NAND memory communicating with a host controller 130 for programming 'n'-level cell blocks, in accordance with an example embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

While the disclosure is susceptible to various modifications and alternative forms, specific example embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the example embodiments of the disclosure, reference is made to the accompanying drawings that form a part hereof, and in which are shown by way of illustration specific example embodiments in which the disclosure may be practiced. These example embodiments are described in sufficient detail to enable those skilled in the art to practice the disclosure, and it is to be understood that other example embodiments may be utilized and that changes may be made without departing from the scope of the present disclosure. The following description is, therefore, not to be taken in a limiting sense.

FIG. 1 is a block diagram representation 100 of a storage device 102 communicating with a host controller 130 for programming 'n'-level cell blocks, in accordance with an example embodiment of the present disclosure. The storage device 102 may include a memory device 104 and a memory controller 120. The storage device 102 may support a plurality of channels $ch_1$ to $ch_m$, and the memory device 104 may be connected to the memory controller 120 through the plurality of channels $ch_1$ to $ch_m$. For example, the storage device 102 may be implemented as a storage device, such as an Solid State Device (SSD).

The memory device 104 may include a plurality of NAND memories $N_{11}$ to $N_{mn}$. The plurality of NAND memories $N_{11}$ to $N_{mn}$ may be arranged in banks and each bank is connected to the memory controller 120 via channels. In general, each NAND memory of the plurality of NAND memories $N_{11}$ to $N_{mn}$ may be connected to one of the plurality of channels $ch_1$ to $ch_m$ through a way corresponding thereto. For instance, the NAND memories $N_{11}$ to $N_{1n}$ may be connected to a first channel $ch_1$ through ways $w_{11}$ to $w_{1n}$, and the NAND memories $N_{21}$ to $N_{2n}$ may be connected to a second channel $ch_2$ through ways $w_{21}$ to $w_{2n}$. In an example embodiment, each (or alternatively, at least one) of the NAND memories $N_{11}$ to $N_{mn}$ may be implemented as an arbitrary memory unit that may operate according to an individual command from the memory controller 120. For example, each (or alternatively, at least one) of the NAND memories $N_{11}$ to $N_{mn}$ may be implemented as a chip or a die, but the inventive concepts are not limited thereto.

The memory controller 120 may transmit and receive signals to and from the memory device 104 through the plurality of channels $ch_1$ to $ch_m$. More specifically, the memory controller 120 may write data into the NAND memories $N_{11}$ to $N_{mn}$ and read data from the NAND memories $N_{11}$ to $N_{mn}$. Accordingly, the memory controller 120 may transmit commands, addresses, and data to the memory device 104 through the channels $ch_1$ to $ch_m$ or receive the data from the memory device 104.

The memory controller 120 may select one of the NAND memories $N_{11}$ to $N_{mn}$, which is connected to each of the channels $ch_1$ to $ch_m$, respectively, by using a corresponding one of the channels $ch_1$ to $ch_m$, and transmit and receive signals to and from the selected NAND memory. For example, the memory controller 120 may select the NAND memory $N_{11}$ from the NAND memories $N_{11}$ to $N_{1n}$ connected to the first channel $ch_1$ for writing data into cells of the NAND memory $N_{11}$. Accordingly, each NAND memory of the NAND memories $N_{11}$ to $N_{mn}$ may include a plurality of 'n'-level cell blocks for storing data. For example, the NAND memory $N_{11}$ stores data in 'n'-level cell blocks such as a single-level cell (SLC) block, a multi-level cell (MLC) block, a triple-level cell (TLC) block, a quad-level cell (QLC) block, a penta-level cell (PLC) block, etc. in which 'n' refers to number of bits of data that can be stored in a cell block. As such, a SLC block stores 1 bit per cell, MLC block stores 2 bits per cell block, a TLC block stores 3 bits per cell block, a QLC block stores 4 bits per cell block, a PLC block stores 5 bits per cell block, and the like. It shall be noted that each NAND memory may include a specific type of cell block, for example, QLC cell blocks, or may include a combination of cell blocks, for example, QLC cell blocks, TLC cell blocks, MLC cell blocks and SLC cell blocks and is beyond the scope of the present disclosure.

In an example embodiment, the NAND memory $N_{11}$ may include one or more NAND latches 110. The one or more NAND latches 110 are hardware accelerators for accelerating read/write operations within the NAND memory $N_{11}$ as will be explained in detail later. It shall be noted that although the one or more NAND latches are depicted only within the NAND memory $N_{11}$, any other NAND memories $N_{12}$ to $N_{mn}$ may also be configured with such one or more NAND latches for accelerating the read/write operations within corresponding NAND memory.

The memory controller 120 may transmit and receive signals to and from the memory device 104 in parallel through different channels. For example, the memory controller 120 may transmit a command CMDb to write data in the NAND memory $N_{22}$ through the second channel $ch_2$ while transmitting a command CMDa to write data in the NAND memory $N_{11}$ through the first channel $ch_1$. As such, the memory controller 120 may control all operations of the memory device 104. The memory controller 120 may transmit a signal to the channels $ch_1$ to $ch_m$ and control each of the NAND memories $N_{11}$ to $N_{mn}$ connected to the channels $ch_1$ to $ch_m$. For instance, the memory controller 120 may transmit the command CMDa and the address ADDRa to the first channel $ch_1$ and control one selected from the NAND memories $N_{11}$ to $N_{1n}$. It shall be noted that the disclosure will hereinafter be explained with reference to writing/reading with reference to a single NAND memory and writing/reading in other NAND memories follow a similar approach and should not be construed as limiting to the present disclosure.

In an example scenario, a host device associated with the host controller 130 may intend to store data and as such, the host controller 130 may write data into a NAND memory, for example, the NAND memory $N_{11}$. More specifically, the host controller 130 may identify a 'n'-level cell block in the NAND memory to write the data. For example, the host controller 130 identifies a QLC block in which the data may be stored. As such, the host controller 130 performs a two-pass approach for writing data into QLC cells of the NAND memory. Such a two-pass approach for writing data in the QLC cell of the NAND memory $N_{11}$, demands significant amounts of additional resources (i.e., data buffers) to store firmware structures and the data and hence difficult to adopt in existing host controllers with limited memory (TCM, SRAM, System's DRAM etc.). It shall be noted that the host controller 130 as used herein refers to a controller of a device, for example, a computer.

Various example embodiments of the present disclosure provide a method for writing data into 'n'-level cell blocks of a NAND memory by the memory controller 120. More specifically, the memory controller 120 uses a set of support cell blocks within the NAND memory for writing the data into the 'n'-level cell block. In general, a mapping defines association between the set of support cell blocks and the 'n'-level cell block. Further, a L2P table is updated based on the mapping to indicate physical addresses in the QLC where the data is being stored. The host controller 130 writes the data into the set of support cell blocks and the memory controller 120 performs a copyback operation from the set of support cell blocks to write the data into the 'n'-level cell block based on the L2P table. Such a technique of the memory controller 120 reduces resource consumption required (or alternatively, used) for writing data into higher-level cell blocks of the NAND memory by the host controller 130, thereby improving performance and operating speed of the NAND device. Further, read requests from the host controller 130 are served from appropriate locations of the NAND memory (i.e., from the support cell block/'n'-level cell block) based on checking status of the write request. The various operations of the memory controller 120 for writing data into the 'n'-level cell blocks and reading the data from the 'n'-level cell blocks has been explained next with reference to FIG. 2.

Figure 2:
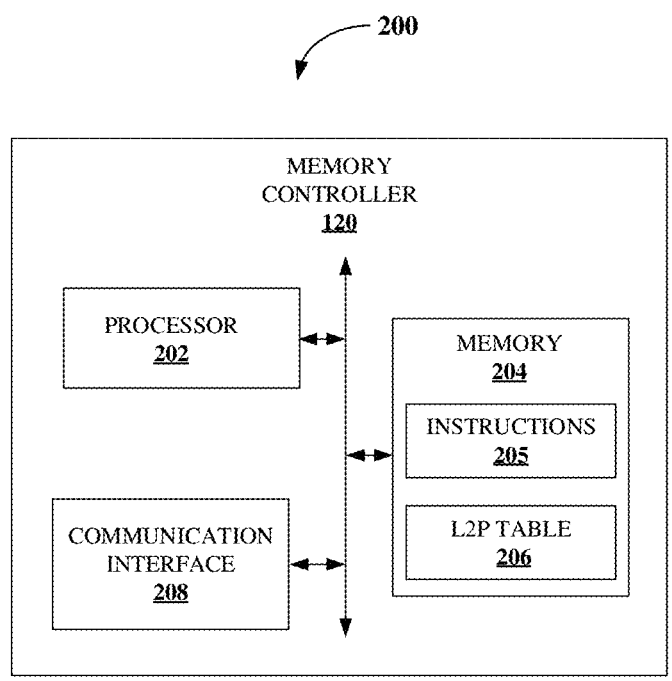
FIG. 2 illustrates a memory controller for writing/reading data into cells of a NAND memory, in accordance with an example embodiment of the present disclosure.

FIG. 2 illustrates the memory controller 120 for writing/reading data into cells of a NAND memory, in accordance with an example embodiment of the present disclosure. In an example embodiment, the memory controller 120 is a stand-alone processor capable of managing read/write requests in the memory device 104. In another example embodiment, the memory controller 120 and the memory device 104 may be implemented as a separate semiconductor chips operably coupled with each other writing/reading data into cells of a NAND memory. Alternatively, in some example embodiments, the memory controller 120 and the memory device 104 may be integrated in the same semiconductor chip.

The term 'support cell blocks' as used herein refers to a set of 'n'-level cell blocks that may be used as an intermediary to write data into another 'n'-level cell block. For example, 4 SLC blocks may be used to write data into a QLC block and as such, the 4 SLC blocks are referred to as 'support cell blocks'. More specifically, these 'n'-level cell blocks are idle blocks in the NAND memory and may be used to write the data received from the host controller 130. In other words, these idle cell blocks are currently not programmed with data and as such are pooled in an idle block pool to facilitate writing of data into a 'n'-level cell block.

The memory controller 120 is depicted to include a processor 202, a memory 204, and a communication interface 208. It shall be noted that, in some example embodiments, the memory controller 120 may include more or fewer components than those depicted herein. The various components of the memory controller 120 may be implemented using hardware, software, firmware or any combinations thereof. Further, the various components of the memory controller 120 may be operably coupled with each other. More specifically, various components of the memory controller 120 may be capable of communicating with each other using communication channel media (such as buses, interconnects, etc.).

In one example embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like.

In one example embodiment, the memory 204 is capable of storing machine executable instructions, referred to herein as instructions 205. In an example embodiment, the processor 202 is embodied as an executor of software instructions. As such, the processor 202 is capable of executing the instructions 205 stored in the memory 204 to perform one or more operations described herein. The memory 204 can be any type of storage accessible to the processor 202 to perform respective functionalities, as will be explained in detail with reference to FIGS. 2 to 6. For example, the memory 204 may include one or more volatile or non-volatile memories, or a combination thereof. For example, the memory 204 may be embodied as semiconductor memories, such as flash memory, mask ROM, PROM (programmable ROM), EPROM (erasable PROM), RAM (random access memory), etc. and the like.

Further, the memory 204 stores a Logical to Physical (L2P) table 206. The L2P table 206 includes a mapping from logical address to physical address in the NAND memory. The logical addresses are used by the host controller 130 to address the NAND memory. For example, the L2P table 206 includes a mapping between logical addresses of the NAND memory to Physical Page Numbers (PPNs) of the NAND memory. The L2P table 206 stores all the logical-to-physical pointer data, enabling the host device to interact with NAND-based SSD. When the host controller 130 intends to read the data, the processor 202 will look up the physical address in the L2P table 206, in order to fetch the data requested. When the host controller 130 writes data in the NAND memory (for example, a 'n'-level cell block), the L2P table 206 will be updated.

In an example embodiment, the processor 202 is configured to execute the instructions 205 for: (1) updating the L2P table 206 based on a mapping between a set of support cell blocks and a 'n'-level cell block, and (2) performing a copyback operation on the set of support cell blocks for writing the data to the 'n'-level cell block based on the L2P table 206. Further, when the processor 202 receives a read request for reading data from a 'n'-level cell block, the processor 202 is configured to execute the instructions 205 for: (1) checking if the 'n'-level cell block of the NAND memory is listed in an active block list, (2) obtaining a mapping between the set of support cell blocks and the 'n'-level cell block based on determining the 'n'-level cell block of the NAND memory is listed in the active block list, (3) retrieving the data from at least one support cell block of a set of support cell blocks associated with the 'n'-level support cell block based on the mapping, (4) retrieving the data from the 'n'-level support cell block based on determining the 'n'-level cell block is not in the active block list, and (5) providing the data to the host controller 130.

In an example embodiment, the communication interface 208 may include mechanisms configured to communicate with other entities, such as, memory device 104, the host controller 130 using different communication protocols. As such, the host controller 130 may request information related to idle support cell blocks in the NAND memory from the memory controller 120. The term 'idle support cell blocks' as used herein refers to 'n'-level cell blocks that are idle. In other words, the 'n'-level cell blocks with no data written are referred to as the idle support cell blocks. The memory controller 120 may collate information related to these idle support cell blocks in the idle support cell block pool and share it with the host controller 130.

In an example scenario, when the host controller 130 intends to write data in the NAND memory, for example, the host controller 130 intends to write the data in a 'n'-level cell block such as, a PLC block to write the data. Then, the host controller 130 identifies a set of support cell blocks from the idle support cell block pool which may be associated with the 'n'-level cell block to facilitate writing of the data to the 'n'-level cell block. In an example embodiment, the host controller 130 may include a set of predefined (or alternatively, desired) rules for allocating the set of support cell blocks for writing the data to the 'n'-level cell block. In an example, a predefined (or alternatively, desired) rule may indicate that at least three support cell blocks may be allocated for writing data to a PLC. In another example, a predefined (or alternatively, desired) rule may indicate that only SLC blocks may be allocated and mapped for writing the data into a QLC block. It shall be noted that the predefined (or alternatively, desired) rules described herein are for example purposes and the predefined (or alternatively, desired) rules may take any form as may be specified for efficiently writing data into the NAND memory.

In an example, 5 SLC blocks may be allocated and mapped to the PLC block for writing the data into the PLC block. In another example, 1 TLC block and 1 MLC block may be allocated and mapped to the PLC block for writing the data into the PLC block. In It shall be noted that identification of the 'n'-level cell block from the idle cell block pool and the set of support cell blocks from the idle support cell block pool may be based on a plurality of parameters, such as, but not limited to, size of the data, data type, number of P/E cycles, and the like. In an example embodiment, the memory controller 120 may provide the data related to the idle support cell block pool to the host controller 130. The host controller 130 may further identify the set of support cell blocks from the idle support cell block pool.

As such, the communication interface 208 is configured to receive write requests from the host controller 130 to write data in the NAND memory. In an example embodiment, the host controller 130 sends a write request to the memory controller 120. The write request from the host controller 130 includes the data to be written into the 'n'-level cell block of the NAND memory from the set of support cell blocks of the NAND memory and information about a mapping between the set of support cell blocks and the 'n'-level cell block. The mapping of the set of support cell blocks of the NAND memory to the 'n'-level cell block of the NAND memory indicates that the set of support cell blocks are associated with the 'n'-level cell block for writing the data into the 'n'-level cell block. More specifically, the mapping includes information on mapping from each page of each support cell block to a corresponding page in the 'n'-level cell block. For example, if 1 MLC block and 1 SLC block are associated with 1 TLC block, then the mapping may indicate writing data from page 1 of MLC to page 1 of TLC, page 2 of MLC to page 2 of TLC and page 1 of SLC to page 3 of TLC. The set of support cell blocks are among a plurality of support cell blocks which are idle in the idle support cell block pool. It shall be noted that the information included in the write request are indicated for example purposes and the write request may include other additional information, for example, logical address of the data in the host controller 130, one or more read/write rules defined by the host controller 130 for writing data, and the like. An example of mapping a 'n'-level cell block to a set of support cell blocks is shown and explained with reference to FIG. 3A.

Figure 3A:
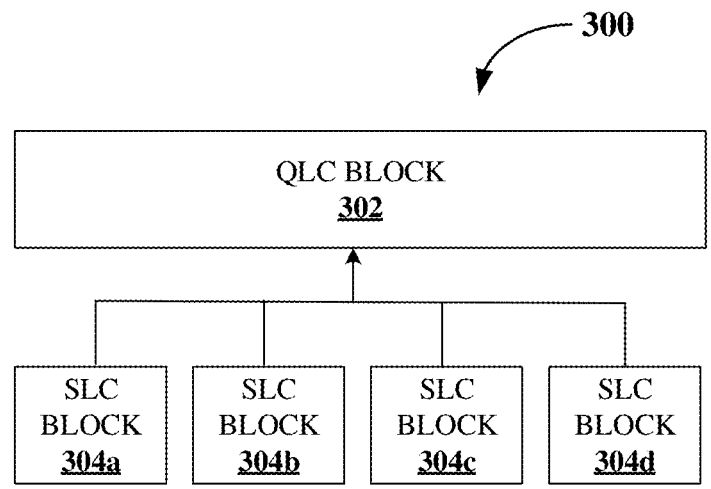
FIG. 3A is an example representation of writing data into a Quad-level cell (QLC) block of the NAND memory, in accordance with an example embodiment of the present disclosure.

Referring now to FIG. 3A, an example representation 300 of writing data into a Quad-level cell (QLC) block 302 of the NAND memory is illustrated in accordance with an example embodiment of the present disclosure. As already explained, when the host controller 130 intends to write data to the NAND memory, then the host controller 130 identifies a 'n'-level cell block from an idle block pool and allocates a set of support cell blocks for writing the data into the 'n'-level cell block.

In this example, representation, a set of support cell blocks 304a, 304b, 304c and 304d (i.e., 4 SLCs) are allocated for writing the data into the QLC block 302. It shall be noted that 4 SLC blocks 304a, 304b, 304c and 304d are shown for example purposes only and number of support cell blocks and type of support cell blocks allocated for the QLC block 302 may vary based on data type, size of the data, availability of support cell blocks and the like. The host controller 130 also performs a mapping of each support cell block of the set of support cell blocks 304a, 304b, 304c and 304d to the QLC block 302. More specifically, each SLC block (i.e., SLC blocks 304a, 304b, 304c and 304d) are mapped to a Physical Page Number (PPN) of the QLC 302. This ensures the data is written into appropriate QLC 302. The host controller 130 allocates and performs the mapping of the set of support cell blocks 304a, 304b, 304c and 304d for the QLC block. Another example of allocating and mapping a set of support cell blocks to the QLC block 302 is shown and explained with reference to FIG. 3B.

Figure 3B:
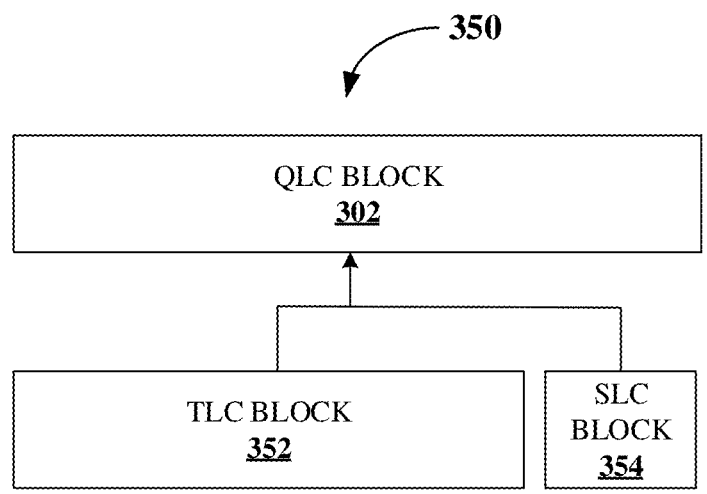
FIG. 3B is an example representation of writing data into a Quad-level cell (QLC) block of the NAND memory, in accordance with another example embodiment of the present disclosure.

Referring now to FIG. 3B, an example representation 350 of writing data into a Quad-level cell (QLC) block 302 of the NAND memory in accordance with another example embodiment of the present disclosure. In this example representation, the host controller 130 allocates 2 support cell blocks for writing the data into the QLC block 302. For example, 1 TLC block 352 and 1 SLC block 354 are allocated and mapped to the QLC block 302. As such, PPNs of the TLC block 352 and PPN of the SLC block 354 will be mapped to the QLC block 302. It will be apparent to a person skilled in the art that any number of support cell blocks and different types of support cell blocks may be used for writing data into higher-level cell blocks with objective of improving the efficiency of the write operation in resource constrained host controller 130. The set of support cell blocks (i.e., 304a, 304b, 304c, 304d or 352, 354) and the 'n'-level cell block (i.e., 302) are in an active block list based on the mapping. In other words, the mapping indicates that these cell blocks are allocated for writing data and are not available for any further read/write operations. In general, the active block list provides information on non-idle 'n'-level cell blocks and non-idle support cell blocks.

Referring back to FIG. 2, the processor 202 in conjunction with the instructions 205 in the memory 204 is configured to write the data in the set of support cell blocks based on the mapping. More specifically, the data received as part of the write request from the host controller 130 is written into the support cell blocks based on the mapping. The processor 202 is further configured to update the L2P table 206 based on the mapping between the set of support cell blocks and the 'n'-level cell block. More specifically, the L2P table 206 is updated to indicate physical addresses in the 'n'-level cell block (for example, physical address of the QLC block 302) in which the data will be stored. It shall be noted that the physical addresses of the support cell blocks are not stored in the L2P table 206 during the write operation. As the physical address of the 'n'-level cell block in which data has to written is updated in the L2P table 206, this precludes the need for frequent updates in the L2P table 206.

In an example embodiment, the processor 202 in conjunction with the instructions 205 of the memory 204 is configured to perform a copyback operation on the set of support cell blocks for writing the data to the 'n'-level cell block based on the L2P table 206 using one or more NAND latches. The term 'copyback' as used herein refers to as an internal data move within the NAND memory. More specifically, the memory controller 120 reads data from one location in the NAND memory and writes the data to another location of the NAND memory during the copyback operation. For example, reading data from the SLC blocks 304a, 304b, 304c and 304d and writing the data into the QLC block 302 (see, FIG. 3A) is referred to as copyback operation. As such, the memory controller 120 performs this internal data move and the host controller 130 is not involved as in the two-pass approach.

As such, the copyback operation is performed on the set of support cell blocks to read the data present in each support cell block of the set of support cell blocks and write the data into the 'n'-level cell block. More specifically, data from each page of each support cell block is read and written into a corresponding page of the 'n'-level cell block based on the mapping using the one or more NAND latches 110 (see, FIG. 1). As already explained, the NAND latches are used for accelerating data read/write operations within the NAND memory. As such, the one or more NAND latches facilitate the copyback from the set of support cell blocks to the 'n'-level cell block internally within the NAND memory. Such techniques of writing data into the 'n'-level cell of the NAND memory precludes the need for large number of data buffers in the host controller 130. Furthermore, as the copyback operation is performed internally within the NAND memory, resources of the host controller 130 are not used extensively and as such, existing host controllers of host devices and memory controllers of NAND memory may be used for writing data into higher-level cell blocks, for example, PLC blocks/QLC blocks using support cell blocks.

Figure 4:
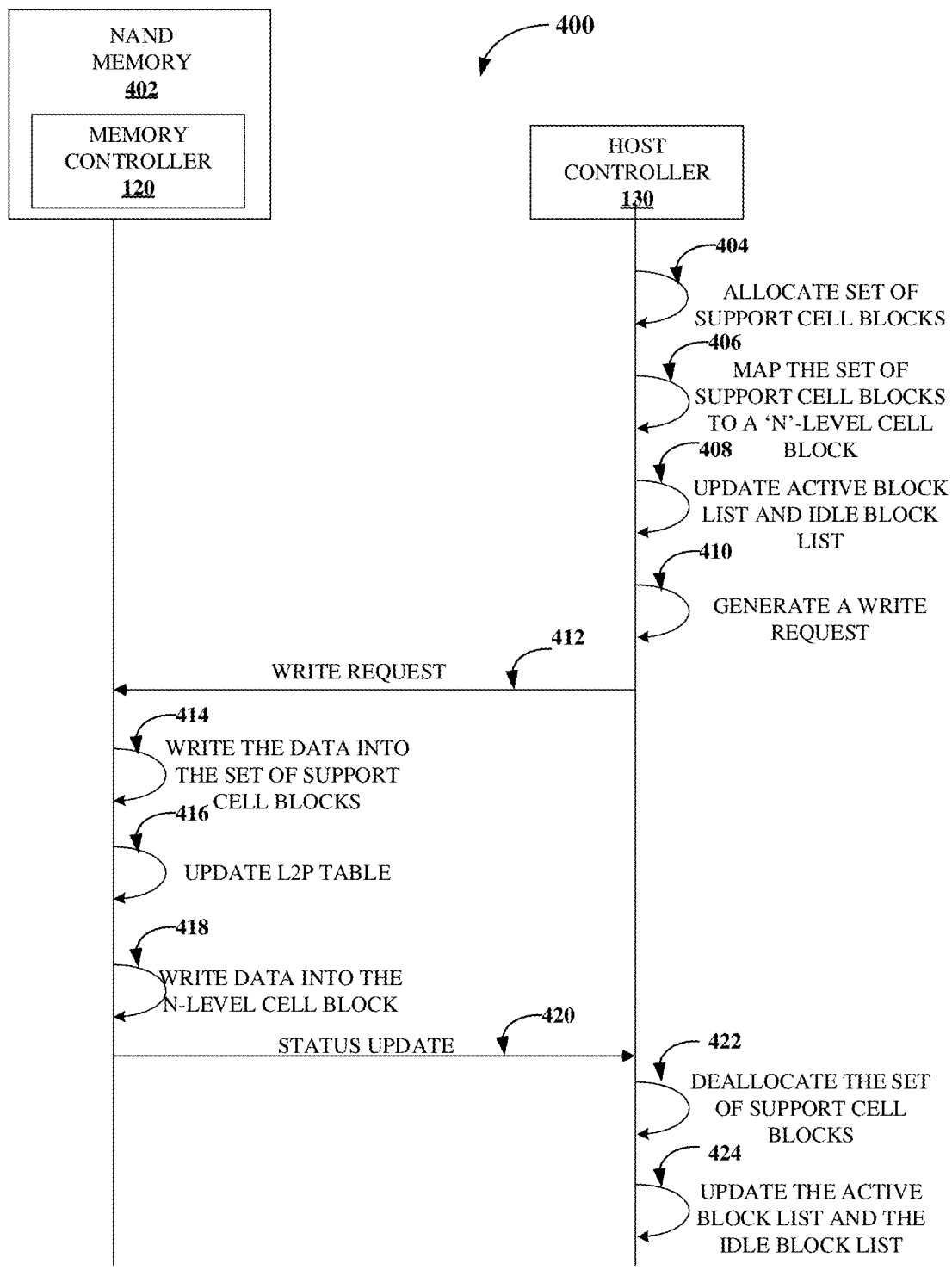
FIG. 4 illustrates a sequence flow diagram for writing data into cells of the NAND memory, in accordance with an example embodiment of the present disclosure.

FIG. 4 illustrates a sequence flow diagram 400 for writing data into cells of a NAND memory 402, in accordance with an example embodiment of the present disclosure. When a host device (not shown in FIG. 4) intends to store data in the NAND memory 402, a write request is generated. It shall be noted that the host controller 130 may be configured within the host device or operably coupled to the host device for facilitating writing/reading of data from the NAND memory 402. Further, the NAND memory 402 and the host controller 130 may be configured within a single device, for example, computer. Alternatively, the NAND memory 402 including the memory controller 120 may be a separate entity and the host controller 130 of the host device may be configured to communicate with the memory controller 120 for reading/writing data in the NAND memory 402.

At 404, the host controller 130 allocates a set of support cell blocks for writing data into a 'n'-level cell block of the NAND memory 402. More specifically, when there is data to be stored in the NAND memory 402, the host controller 130 analyzes the data and idle block pool to identify a 'n'-level cell block into which the data can be written. More specifically, data size, data type and other parameters or predefined (or alternatively, desired) set of rules may be considered to identify the 'n'-level cell block into which data can be written. Accordingly, the host controller 130 selects a set of support cell blocks based on the identified 'n'-level cell block as explained with reference to FIGS. 3A-3B.

At 406, the host controller 130 maps the set of support cell blocks to the 'n'-level cell block. More specifically, a physical page of each support cell block of the set of support cell block is mapped to a physical page of the 'n'-level cell block to indicate where the data has to be written into the 'n'-level cell block. Such mapping of the set of support cell blocks to the 'n'-level cell block ensures the data is written into correct memory locations.

At 408, the host controller 130 updates an active block list and an idle block list. The active block list includes information on non-idle 'n'-level cell blocks and non-idle support cell blocks. The non-idle 'n'-level cell blocks and the non-idle support cell blocks includes cell blocks into which data has already been written by the memory controller 120 or cell blocks into which the memory controller 120 is currently writing data. As these cell blocks are not available for storing data, they are in the active block list. The idle block list includes information on idle 'n'-level cell blocks and idle support cell blocks. More specifically, support cell blocks and 'n'-level cell blocks which have no stored data are in the idle block list indicating that these cell blocks are available for storing data.

At 410, the host controller 130 generates a write request. The write request includes the data and information about the mapping between the set of support cell blocks and the 'n'-level cell block. More specifically, the write request from the host controller 130 indicates to the memory controller 120 to write data present in a set of support cell blocks of the NAND memory 402 into a 'n'-level cell block of the NAND memory 402.

At 412, the host controller 130 sends write request to the memory controller 120. Accordingly, the memory controller 120 writes the data into the set of support cell blocks before writing the data into the 'n'-level cell block (see, 414).

At 416, the memory controller 120 updates a L2P table 206. More specifically, the L2P table 206 is updated with physical page numbers in the 'n'-level cell block into which the data is written. In other words, the L2P table 206 is updated based on the mapping. However, it shall be noted that only PPNs of the 'n'-level cell block of the NAND memory 402 is updated in the L2P table 206 and not the PPNs of the set of support cell blocks in which the data is initially written based on the mapping. This ensures that the L2P table 206 is not updated frequently.

At 418, the memory controller 120 writes the data into the 'n'-level cell block. More specifically, the memory controller 120 performs a copyback operation on the set of support cell blocks to copyback the data present in the set of support cell blocks to the 'n'-level cell block.

At 420, the memory controller 120 sends a status update to the host controller 130. When the data is written into the 'n'-level cell block, the memory controller 120 sends the status update indicating a completion of the write operation into the 'n'-level cell block.

At 422, the host controller 130 de-allocates the set of support block associated with the 'n'-level cell block. More specifically, the set of support cell blocks are disassociated from the set of support cell blocks and are in an idle support cell block pool after the copyback operation. The 'n'-level cell block with the data is moved from the active block list to a user block pool. The user block pool includes information on all 'n'-level cell blocks that store data.

At 424, the host controller 130 updates the active block list and the idle block list. In some example embodiment, the host controller 130 may query the memory controller 120 at defined time intervals for receiving information related to the active block list and the idle block list. It shall be noted that the memory controller 120 may also store the active block list and the idle block list which is provided to the host controller 130 on request.

Referring now to FIG. 2, the communication interface 208 of the memory controller 120 is configured to receive a read request from the host controller 130 to read data from an 'n'-level cell block of the NAND memory. The read request may include a logical address corresponding to at least one physical address of the NAND memory from which the data has to be retrieved.

The processor 202 in conjunction with the instructions 205 of the memory 204 is configured to retrieve the data for the host controller 130. Accordingly, the processor 202 is configured to check if the 'n'-level cell block of the NAND memory is listed in the active block list. As already explained, the active block list includes information on non-idle 'n'-level cell blocks and non-idle support cell blocks. As such, if the 'n'-level cell block is listed in the active block list, then it indicates that data is currently being written to the 'n'-level cell block from the set of support cell blocks. In such scenarios, the memory controller 120 may not be able to retrieve the data from the 'n'-level cell block. For instance, as the write operation is currently being performed on the 'n'-level cell block, the 'n'-level cell block may include only a fragment of data, for example, a QLC block into which data is being written will have only 2 bits of data and not the data in entirety (i.e., 4 bits).

In an example embodiment, the processor 202 is configured to obtain the mapping between the set of support cell blocks and the 'n'-level cell block based on determining the 'n'-level cell block of the NAND memory is listed in the active block list. As the data has still not been completely written into the 'n'-level cell block, the data will be present in the set of support cell blocks. The mapping provides information on the set of support cell blocks associated with the 'n'-level cell block and the appropriate set of support cell blocks are identified from the mapping. The processor 202 is further configured to retrieve the data from at least one support cell block of the set of support cell blocks associated with the 'n'-level cell block. More specifically, the at least one support cell block is identified from the set of support cell blocks based on the mapping and the read request. For example, if the read request includes logical address that corresponds to only one PPN of the 'n'-level cell block, for example, a PLC, then the mapping is used to identify PPN of the support cell block corresponding to the PPN of the 'n'-level cell block. The data retrieved from the PPN of the at least one support cell block is provided to the host controller 130 to serve the read request.

In another example embodiment, the memory controller 120 retrieves the data from the 'n'-level cell block based on determining the 'n'-level cell block is not in the active block list. If the data has been written into the 'n'-level cell block, then the 'n'-level cell block is moved from the active block list to the user block pool. In such scenarios, the memory controller 120 is configured to perform a lookup to the L2P table 206 and identify PPN of the 'n'-level cell block for reading the data. It shall be noted that the above described read operation may be performed on any NAND memory which performs write operations as described with reference to FIGS. 2-4 for writing data into the 'n'-level cell block. A method for writing data into cells of the NAND memory is explained next with reference to FIG. 5.

Figure 5:
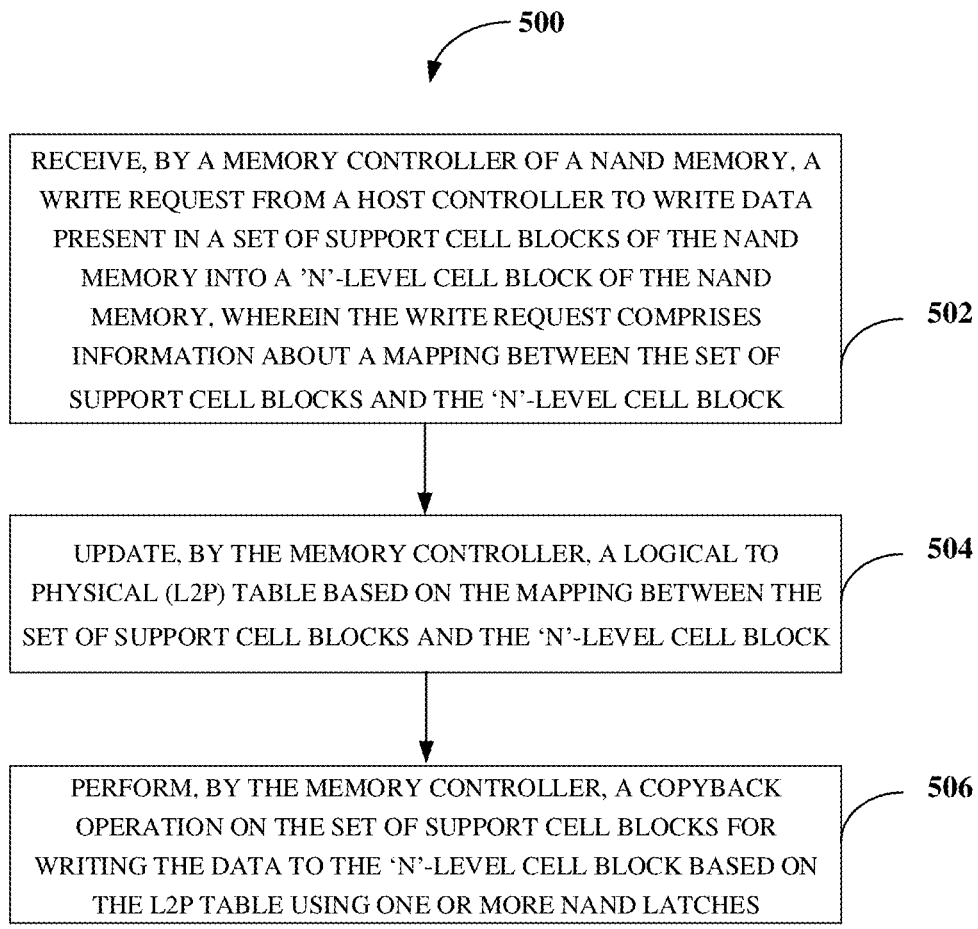
FIG. 5 is a flowchart illustrating a method for writing data into cells of a NAND memory, in accordance with an example embodiment of the present disclosure.

FIG. 5 is a flowchart illustrating a method 500 for writing data into cells of a NOT-AND (NAND) memory, in accordance with an example embodiment of the present disclosure. The method 500 depicted in the flow diagram may be executed by, for example, the processor 202 of the memory controller 120 as shown and explained with reference to FIGS. 2-4. Operations of the flow diagram, and combinations of operation in the flow diagram, may be implemented by, for example, hardware, firmware, a processor, circuitry and/or a different device associated with the execution of software that includes one or more computer program instructions. The operations of the method 500 are described herein with help of the processor 202 of the memory controller 120. The method 500 starts at operation 502.

At operation 502 of the method 500, a write request from the host controller 130 to write data present in a set of support cell blocks of the NAND memory into a 'n'-level cell block of the NAND memory is received by a memory controller, for example, the memory controller 120 shown and explained with reference to FIGS. 2-4. The write request includes information about a mapping between the set of support cell blocks and the 'n'-level cell block.

At operation 504 of the method 500, a Logical to Physical (L2P) table is updated based on the mapping between the set of support cell blocks and the 'n'-level cell block.

At operation 506 of the method 500, a copyback operation is performed on the set of support cell blocks for writing the data to the 'n'-level cell block based on the L2P table 206 using one or more NAND latches. A method of serving read requests from cells in the NAND memory is explained next with reference to FIG. 6.

Figure 6:
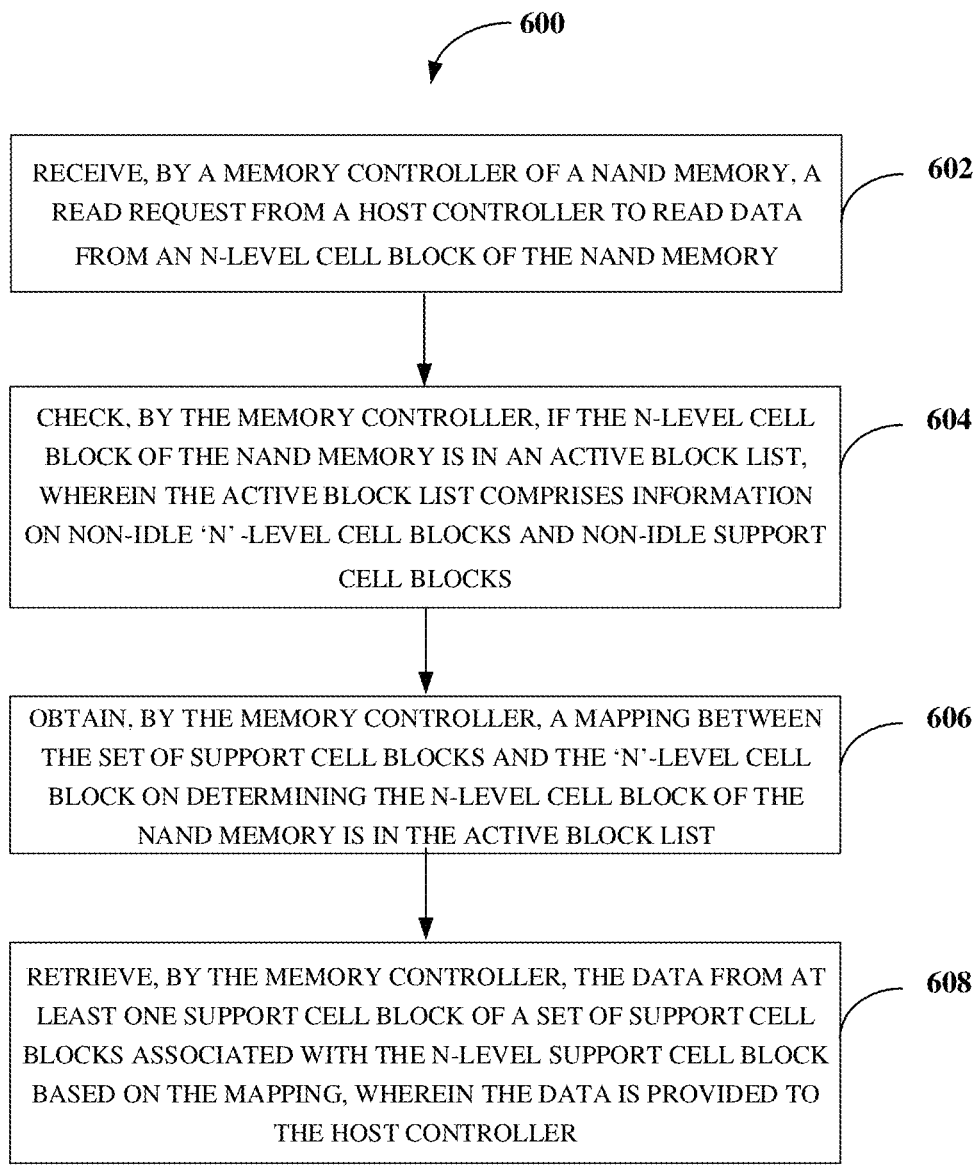
FIG. 6 is a flowchart illustrating a method for reading data from cells of a NAND memory, in accordance with an example embodiment of the present disclosure.

FIG. 6 is a flowchart illustrating a method 600 for reading data from cells in a NOT-AND (NAND) memory, in accordance with an example embodiment of the present disclosure. The method 600 depicted in the flow diagram may be executed by, for example, the memory controller 120 shown and explained with reference to FIGS. 2-5. Operations of the flow diagram, and combinations of operation in the flow diagram, may be implemented by, for example, hardware, firmware, a processor, circuitry and/or a different device associated with the execution of software that includes one or more computer program instructions. The operations of the method 600 are described herein with help of the processor 202 of the memory controller 120. The method 600 starts at operation 602.

At operation 602 of the method 600, a read request from a host controller 130 to read data from an 'n'-level cell block of the NAND memory is received by a memory controller of the NAND memory, for example, the memory controller 120 shown and explained with reference to FIGS. 2-4.

At operation 604 of the method 600, the memory controller 120 checks if the 'n'-level cell block of the NAND memory is listed in an active block list. The active block list includes information on non-idle 'n'-level cell blocks and non-idle support cell blocks. The 'n'-level cell block in the active block list indicates that data is being written to the 'n'-level cell block.

At operation 606 of the method 600, a mapping between the set of support cell blocks and the 'n'-level cell block is obtained on determining the 'n'-level cell block of the NAND memory is listed in the active block list. If the 'n'-level cell block is listed in the active block list, the data is retrieved from at least one support cell block of the set of support cell blocks in which the data is present based on the read request and the mapping.

At operation 608 of the method 600, the data is retrieved from at least one support cell block of a set of support cell blocks associated with the 'n'-level support cell block based on the mapping. The data is provided to the host controller 130. If the 'n'-level cell block is not in the active block list, then the data is retrieved from the 'n'-level cell block based on the L2P table 206.

The sequence of operations of the method 500/600 need not be necessarily executed in the same order as they are presented. Further, one or more operations may be grouped together and performed in form of a single step, or one operation may have several sub-steps that may be performed in parallel or in sequential manner.

The disclosed method with reference to FIGS. 5 and 6, or one or more operations of the flow diagram depicted by methods 500/600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer.

Figure 7:
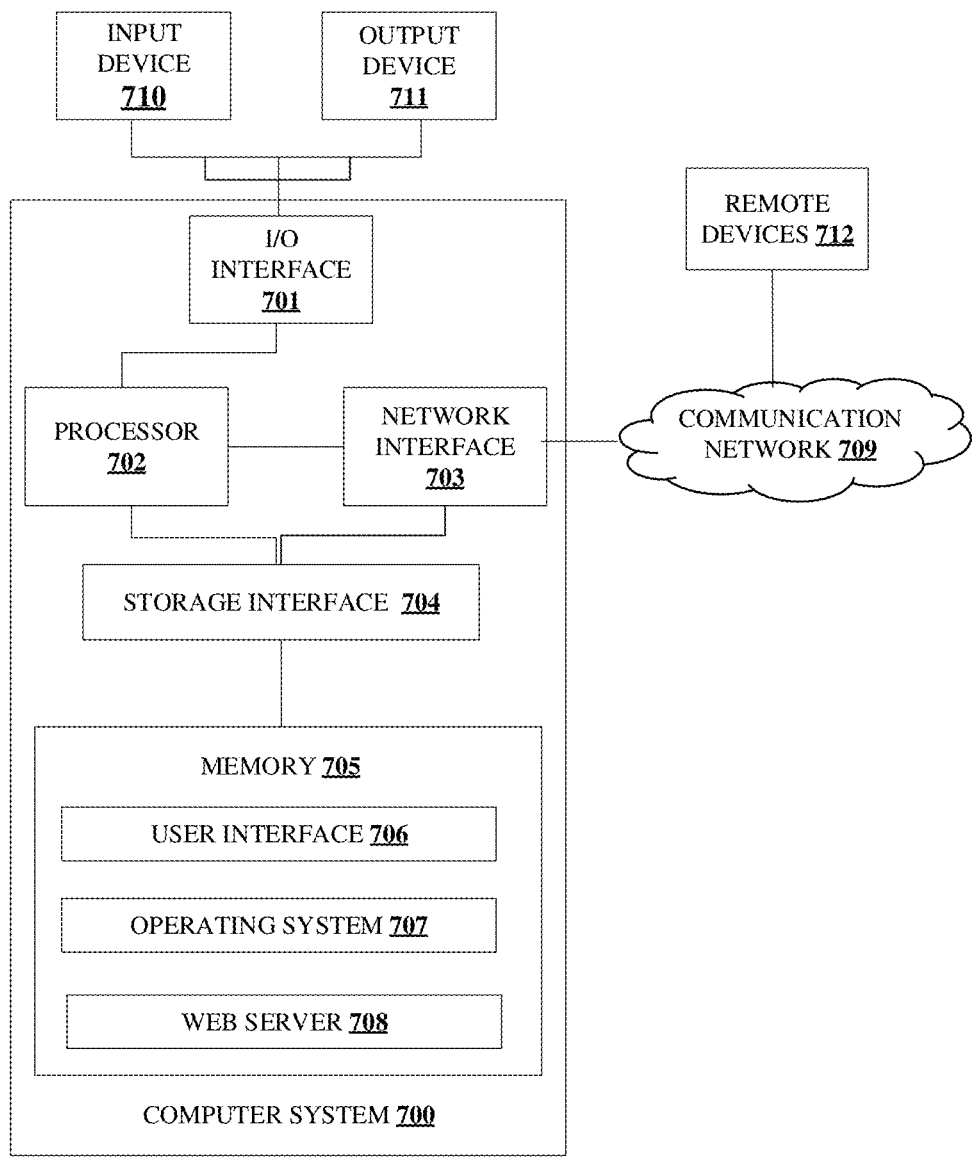
FIG. 7 shows a block diagram of a general-purpose computer for performing read-write operation in a NAND memory, in accordance with an example embodiment of the present disclosure.

FIG. 7 shows a block diagram of a general-purpose computer for performing read-write operation in a NAND memory, in accordance with an example embodiment of the present disclosure. The computer system 700 may comprise a central processing unit ("CPU" or "processor") 702. The processor 702 may comprise at least one data processor. The processor 702 may include specialized processing units such as integrated system (bus) controllers, memory management control units, floating point units, graphics processing units, digital signal processing units, etc. The computer system 700 may be analogous to the memory controller 120 (shown in FIG. 2).

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some example embodiments, the computer system 700 is connected to the remote devices 712 through a communication network 709. The remote devices 712 may be peripheral devices such as solid state devices (e.g., memory device 104) which communicate with the memory controller 120 for reading/writing data. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with the remote devices 712. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, 3GPP and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some example embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708, etc. In some example embodiments, computer system 700 may store user/application data, such as, the data, variables, records, etc., as described in this disclosure. Such databases may be implemented as fault-tolerant, relational, scalable, secure databases such as Oracle @ or Sybase®.

The operating system 707 may facilitate resource management and operation of the computer system 700. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some example embodiments, the computer system 700 may implement a web browser 708 stored program component. The web browser 708 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBER FLASH™, JAVASCRIPT™, JAVA™, Application Programming Interfaces (APIs), etc. In some example embodiments, the computer system 700 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™ JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some example embodiments, the computer system 700 may implement a mail client stored program component. The mail client may be a mail viewing application, such as APPLE® MAIL™ MICROSOFT® ENTOURAGE™, MICROSOFT® OUTLOOK™, MOZILLA® THUNDERBIRD™, etc.

Furthermore, one or more computer-readable storage media may be utilized in implementing example embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the example embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

Various example embodiments of the present disclosure provide numerous advantages. Example embodiments of the present disclosure provide a method and system for performing read and write operations in cells of a NAND memory. The read/write operations using support cell blocks preclude the need for significant amount of additional resources to store the firmware structures and user data buffers in host controllers, thereby ensuring the existing host controller 130/memory controller 120 easily adopt for performing read/write operations in higher-level cell blocks. In other words, existing memory controller designs may be used for performing read/write operations with higher level cell blocks such as, QLC, PLC, 'X'LC, and the like without limitations about SRAM, TCM, DRAM budgets every time. Moreover, SLC blocks as support cell blocks are highly reliable and internal read by performing copyback operation from support cell blocks to 'n'-level cell block will not have any error during internal data movement from SLC block to 'n'-level cell block (e.g., QLC block/PLC block). Moreover, copyback operation is performed immediately after writing data into the set of support cell blocks so there is no impact of any other reliability issue on SLC block such as RD/retention/temperature variation and etc. Furthermore, internal copy back acceleration using NAND latches helps in reduction of 2 DMA operations to pull the data out to DRAM and back to the NAND memory thereby, saving power and speed. In addition, updating the L2P table 206 with physical address of the 'n'-level cell block avoids multiple updates to the L2P table 206. Moreover, the disclosed read/write operations is scalable to other futuristic 'n'-level cell blocks while maintaining the same architecture of the memory controller 120.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

Any of the elements and/or functional blocks disclosed above may include or be implemented in processing circuitry such as hardware including logic circuits; a hardware/software combination such as a processor executing software; or a combination thereof. For example, the memory controller 120, host controller 130, and processor 202, may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While various aspects and example embodiments have been disclosed herein, other aspects and example embodiments will be apparent to those skilled in the art. The various aspects and example embodiments disclosed herein are for purposes of illustration and are not intended to be limiting, with the true scope and spirit being indicated by the following detailed description.

What is claimed is:

1. A method for writing data into cells of a NOT-AND (NAND) memory, the NAND memory including a plurality of non-volatile memory cells and one or more volatile NAND latches configured to temporarily store data before writing the data to the plurality of non-volatile memory cells, the method comprising:
   receiving, by a memory controller of the NAND memory, a write request from a host controller to write data present in a set of support cell blocks of the NAND memory into a 'n'-level cell block of the NAND memory, wherein the write request comprises information on mapping from each page of the set of support cell blocks to a corresponding page in the 'n'-level cell block;
   updating, by the memory controller, a Logical to Physical (L2P) table based on the mapping between the set of support cell blocks and the 'n'-level cell block; and
   performing, by the memory controller, a copyback operation on the set of support cell blocks for writing the data to the 'n'-level cell block based on the L2P table using the one or more volatile NAND latches as hardware accelerators configured to perform the copyback operation as an internal copyback operation without the host controller tracking intermediate single-level cell (SLC) locations in the L2P table.

2. The method as claimed in claim 1, wherein the 'n'-level cell block is one of: a Multi-Level Cell (MLC) block, a Triple Level Cell (TLC) block, a Quad Level Cell (QLC) block and a Penta Level Cell (PLC) block.

3. The method as claimed in claim 1, wherein the set of support cell blocks are among a plurality of support cell blocks which are idle.

4. The method as claimed in claim 3, wherein the plurality of support cell blocks comprise one or more of: a Single Level Cell (SLC) block, a Multi-Level Cell (MLC) block, a Triple Level Cell (TLC) block, a Quad Level Cell (QLC) block and a Penta Level Cell (PLC) block.

5. The method as claimed in claim 1, wherein the set of support cell blocks and the 'n'-level cell block are listed in an active block list based on the mapping, and wherein the active block list provides information on non-idle 'n'-level cell blocks and non-idle support cell blocks.

6. The method as claimed in claim 1, wherein the set of support cell blocks are in an idle support cell block pool after the copyback operation.

7. A method for reading data from cells in a NOT-AND (NAND) memory, the method comprising:
   receiving, by a memory controller of a NAND memory, a read request from a host controller to read data from an 'n'-level cell block of the NAND memory;
   checking, by the memory controller, if the 'n'-level cell block of the NAND memory is listed in an active block list, wherein the active block list comprises information on non-idle 'n'-level cell blocks and non-idle support cell blocks;
   obtaining, by the memory controller, a mapping from each page of a set of support cell blocks to a corresponding page in the 'n'-level cell block based on determining the 'n'-level cell block of the NAND memory is listed in the active block list; and retrieving, by the memory controller, the data by,
retrieving the data from at least one support cell block of the set of support cell blocks associated with the 'n'-level cell block based on the mapping, in response to the 'n'-level cell block being in the active block list, and
retrieving the data from the 'n'-level cell block based on a Logical to Physical (L2P) table, in response to the 'n'-level cell block not being in the active block list,
wherein the data from the at least one support cell block is provided to the host controller.

8. The method as claimed in claim 7, wherein the data is retrieved from the 'n'-level cell block based on determining the 'n'-level cell block is not in the active block list based on a Logical to Physical (L2P) table.

9. The method as claimed in claim 7, wherein the at least one support cell block is identified from the set of support cell blocks based on the mapping and the read request.

10. A memory controller for writing data into cells of a NOT-AND (NAND) memory, the NAND memory including a plurality of non-volatile memory cells and one or more volatile NAND latches configured to temporarily store data before writing the data to the plurality of non-volatile memory cells, the memory controller comprising:
a memory configured to store instructions; and
a processor configured to execute the instructions stored in the memory and cause the memory controller to
receive a write request from a host controller to write data present in a set of support cell blocks of the NAND memory into a 'n'-level cell block of the NAND memory, wherein the write request comprises information on mapping from each page of the set of support cell blocks to a corresponding page in the 'n'-level cell block,
update a Logical to Physical (L2P) table based on the mapping between the set of support cell blocks and the 'n'-level cell block, and
perform a copyback operation on the set of support cell blocks for writing the data to the 'n'-level cell block based on the L2P table using the one or more volatile NAND latches as hardware accelerators that perform the copyback operation as an internal copyback operation without the host controller tracking intermediate single-level cell (SLC) locations in the L2P table.

11. The memory controller as claimed in claim 10, wherein the 'n'-level cell block is one of: a Multi-Level Cell (MLC) block, a Triple Level Cell (TLC) block, a Quad Level Cell (QLC) block and a Penta Level Cell (PLC) block.

12. The memory controller as claimed in claim 10, wherein the processor is configured to execute the instructions stored in the memory such that the set of support cell blocks are among a plurality of support cell blocks which are idle.

13. The memory controller as claimed in claim 12, wherein the plurality of support cell blocks comprise one or more of: a Single Level Cell (SLC) block, a Multi-Level Cell (MLC) block, a Triple Level Cell (TLC) block, a Quad Level Cell (QLC) block and a Penta Level Cell (PLC) block.

14. The memory controller as claimed in claim 10, wherein the processor is configured to execute the instructions stored in the memory such that the set of support cell blocks and the 'n'-level cell block are listed in an active block list based on the mapping, and wherein the active block list provides information on non-idle 'n'-level cell blocks and non-idle support cell blocks.

15. The memory controller as claimed in claim 10, wherein the processor is configured to execute the instructions stored in the memory such that the set of support cell blocks are in an idle support cell block pool after the copyback operation.

* * * * *